(12) United States Patent
Honma

(10) Patent No.: US 7,787,023 B2
(45) Date of Patent: *Aug. 31, 2010

(54) VIDEO SIGNAL PROCESSING APPARATUS

(75) Inventor: Yoshihiro Honma, Asaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

This patent is subject to a terminal disclaimer.

(21) Appl. No.: 12/189,061

(22) Filed: Aug. 8, 2008

(65) Prior Publication Data

US 2008/0303948 A1    Dec. 11, 2008

Related U.S. Application Data

(63) Continuation of application No. 11/015,825, filed on Dec. 17, 2004, now Pat. No. 7,411,613.

(30) Foreign Application Priority Data

Dec. 19, 2003   (JP) .............................. 2003-422338

(51) Int. Cl.
*H04N 5/228* (2006.01)

(52) U.S. Cl. .................................................. 348/222.1
(58) Field of Classification Search ................. 345/546, 345/547; 348/208.6, 222.1; 384/569, 584
See application file for complete search history.

(56) References Cited

U.S. PATENT DOCUMENTS

| 5,264,933 A | * | 11/1993 | Rosser et al. ............... 348/578 |
| 6,337,692 B1 | * | 1/2002 | Rai et al. ..................... 345/594 |
| 2002/0003578 A1 | * | 1/2002 | Koshiba et al. ............. 348/273 |

FOREIGN PATENT DOCUMENTS

JP       2001025030 A     1/2001

\* cited by examiner

*Primary Examiner*—David L Ometz
*Assistant Examiner*—Akshay Trehan
(74) *Attorney, Agent, or Firm*—Canon U.S.A., Inc. I.P. Division

(57) ABSTRACT

By setting an area for displaying OSD data, a high-intensity part of this area is highlighted and an area which is not to be highlighted is set. Also, by performing translucent display of the OSD data and natural-image data, an area which is not to be highlighted can be set.

5 Claims, 8 Drawing Sheets

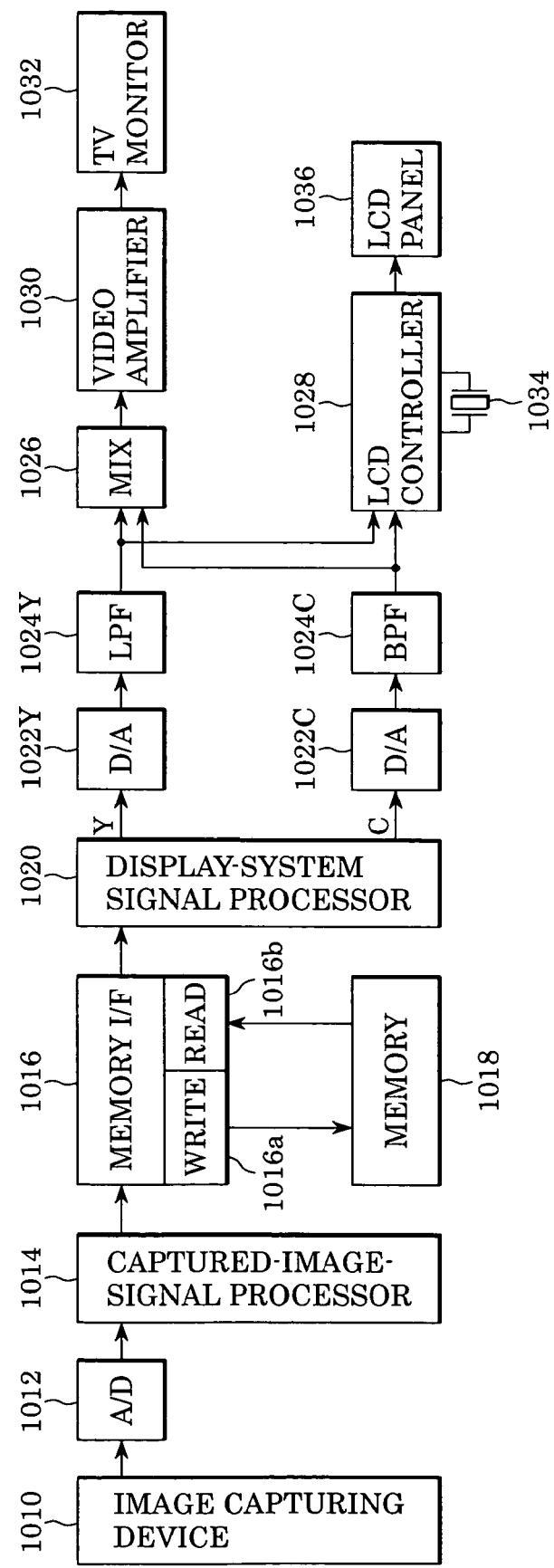

VIDEO SIGNAL PROCESSING APPARATUS

CROSS REFERENCE TO RELATED APPLICATIONS

This application is a continuation of U.S. patent application Ser. No. 11/015,825 filed Dec. 17, 2004 which claims priority from Japanese Patent Application No. 2003-422338 filed Dec. 19, 2003, which are hereby incorporated by reference herein.

BACKGROUND OF THE INVENTION

1. Field of the Invention

The present invention relates to a video signal processing apparatus.

2. Description of the Related Art

FIG. 8 is a block diagram showing a schematic configuration of a known image capturing apparatus disclosed in Japanese Patent Laid-Open No. 2001-025030. In this image capturing apparatus, an image capturing device 1010 converts an optical image to an image signal, and an A/D converter 1012 converts the analog output from the image capturing device 1010 to a digital signal. A captured-image-signal processor 1014 executes removal of color carrier, aperture correction, and gamma processing on the output data from the A/D converter 1012 in order to generate a luminance signal. Also, the captured-image-signal processor 1014 executes color interpolation, matrix conversion, gamma processing, and gain control on the output data in order to generate color-difference signals, so that video data in YUV format is created.

A memory interface 1016 includes a writing circuit 1016a and a reading circuit 1016b for a memory 1018. The memory interface 1016 writes the video data from the captured-image-signal processor 1014 in the memory 1018, and reads the video data stored in the memory 1018 and outputs the video data to a display-system signal processor 1020.

The display-system signal processor 1020 separates the video data in YUV format into a luminance component Y and a modulation color-difference component, that is, a so-called modulation chroma component C, and applies the luminance component Y and the chroma component C to D/A converters 1022Y and 1022C, respectively. The D/A converter 1022Y converts the luminance data from the display-system signal processor 1020 to an analog signal, and then a low-pass filter (LPF) 1024Y removes a high-frequency noise component from the output from the D/A converter 1022Y. The output from the LPF 1024Y is applied to a mixer 1026 and an LCD controller 1028. On the other hand, the D/A converter 1022C converts the modulation chroma data from the display-system signal processor 1020 to an analog signal, and then a band-pass filter (BPF) 1024C extracts only a frequency component of a modulation chroma component from the output from the D/A converter 1022C. The output from the BPF 1024C is applied to the mixer 1026 and the LCD controller 1028.

The mixer 1026 mixes the luminance signal from the LPF 1024Y and the modulation chroma signal from the BPF 1024C so as to generate a composite video signal. A video amplifier 1030 amplifies the composite video signal output from the mixer 1026 and applies the signal to a TV monitor 1032. Accordingly, an image captured by the image capturing device 1010 is displayed on a screen of the TV monitor 1032.

The LCD controller 1028 converts the luminance signal Y from the LPF 1024Y and the modulation chroma signal C from the BPF 1024C to an RGB signal in accordance with a sub-carrier frequency of a quartz oscillator 1034, and applies the RGB signal together with a driving pulse to a liquid crystal display (LCD) panel 1036. Accordingly, the LCD panel 1036 displays the image captured by the image capturing device 1010 on its screen.

In this known image capturing apparatus, the dynamic range of the LCD is insufficient to express high and low intensity. In particular, the gradation in high- and low-intensity areas of a displayed image is poorly expressed. Therefore, it is difficult to visually check distortion in high- and low-intensity areas in the displayed image so as to manually adjust exposure or to compensate exposure. In order to overcome this problem, the following method has been used. That is, during a review after taking an image, a high-intensity area is highlighted in order to clearly display the high-intensity area in the LCD.

Hitherto, in order to perform highlight display by using on screen display (OSD), the luminance level of each pixel of natural-image VRAM data is measured, OSD data for highlight display is created based on the measurement result, and then the OSD data is written in a memory. In this method, however, OSD data must be created every time the natural-image VRAM data changes, and thus it takes some time to perform highlight display.

When an electronic viewfinder (EVF) is used, since the rate of displaying images read by an image capturing device is high, an operation of rewriting OSD data for highlight display cannot keep up with the rate. Therefore, highlight display cannot be performed.

Also, at an electronic zoom operation in the EVF, the rewriting operation cannot keep up with the changes of a zoom factor, and thus highlight display cannot be realized.

When an image is zoomed during playback, highlight display cannot be performed in synchronization with the zoomed played back image. Therefore, the highlight display cannot be completed until some time passes after the played back image has been zoomed.

SUMMARY OF THE INVENTION

The present invention has been made in view of the above-described problems, and an object of the present invention is to provide a video signal processing apparatus which smoothly performs highlight display by using OSD.

In order to achieve the object, according to a preferred embodiment of the present invention, a video signal processing apparatus includes a first storage unit for storing input first image data; a second storage unit for storing second image data; a first comparing unit for comparing luminance-signal component data in the first image data with a predetermined level; a modifying unit for modifying the second image data based on the output from the first comparing unit; and a synthesizing unit for synthesizing the first image data and the second image data modified by the modifying unit and outputting the synthesized data.

Also, according to a preferred embodiment of the present invention, by switching OSD data to an OSD data value having a palette color for highlight display according to the level of luminance signal of image data, a high-intensity part of the image data can be highlighted.

Further objects, features and advantages of the present invention will become apparent from the following description of the preferred embodiments with reference to the attached drawings.

BRIEF DESCRIPTION OF THE DRAWINGS

FIG. 8 is a block diagram showing a schematic configuration of a known image capturing apparatus.

DESCRIPTION OF THE EMBODIMENTS

Hereinafter, preferred embodiments of the present invention will be described.

First Embodiment

Figure 1:
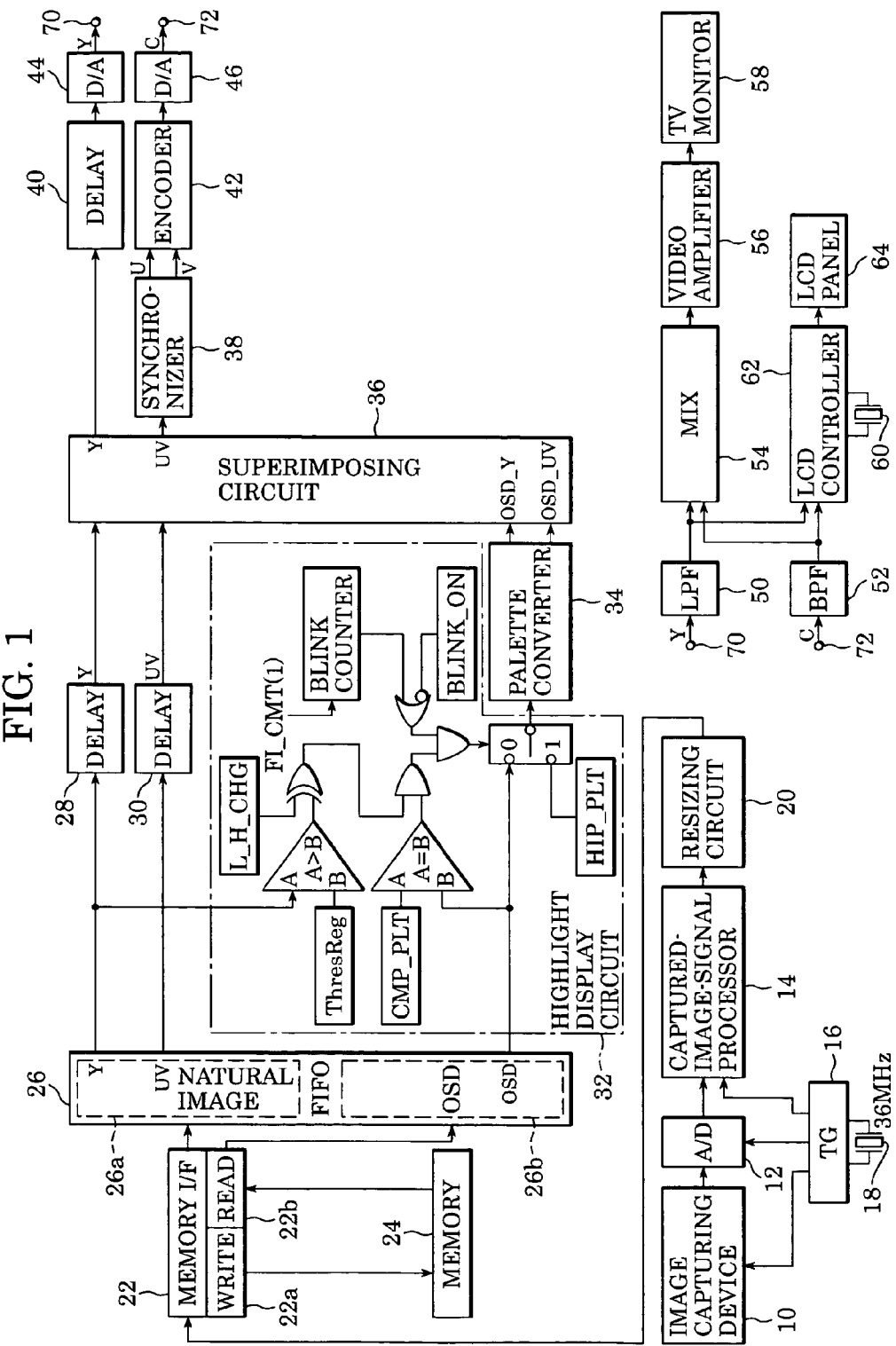
FIG. 1 is a block diagram showing a schematic configuration of a video signal processing apparatus according to a first embodiment of the present invention.

A first embodiment of the present invention is described below with reference to the drawings. FIG. 1 is a block diagram showing a schematic configuration of a video signal processing apparatus according to the first embodiment of the present invention. The video signal processing apparatus includes an image capturing device 10 for converting an optical image to an electric signal; an A/D converter 12 for converting the analog image signal from the image capturing device 10 to a digital signal; a captured-image-signal processor 14 which generates a luminance signal by executing removal of a color carrier, aperture correction, and gamma processing on the output data from the A/D converter 12 and which also generates color-difference signals by executing color interpolation, matrix conversion, gamma processing, and gain control, so as to create video data in YUV format; and a timing generator (TG) 16 which generates clocks and timing signals required by the image capturing device 10, the A/D converter 12, and the captured-image-signal processor 14 in accordance with the output from a quartz oscillator 18 (the oscillation frequency is 36 MHz, for example) and which supplies the clocks and timing signals to the image capturing device 10, the A/D converter 12, and the captured-image-signal processor 14.

Also, the video signal processing apparatus includes a resizing circuit 20 which resizes the image data from the captured-image-signal processor 14 into a display size; and a memory interface 22 which includes a writing circuit 22a and a reading circuit 22b for a memory (DRAM) 24 and which writes the video data from the resizing circuit 20 in the memory 24 and reads the video data stored in the memory 24. Memory space (so-called VRAM) for displaying images is allocated on the memory 24.

A method for storing image data in the VRAM includes two types: Y:U:V=4:2:2, and Y:U:V=4:1:1. Assume that each of the luminance signal Y and the color-difference signals U/V is 8-bit data. In this case, when Y:U:V=4:2:2, the data is stored in the VRAM in the following manner:

Upper-byte data=Y0, Y1, Y2, Y3, Y4, Y5, Y6, Y7, . . .

Lower-byte data=U0, V0, U2, V2, U4, V4, U6, V6, . . . .

On the other hand, when Y:U:V=4:1:1, the data is stored in the VRAM in the following manner:

Upper-byte data=Y0, Y1, Y3, Y4, Y5, Y7, . . .

Lower-byte data=U0, V0, Y2, U4, V4, Y6, . . . .

The amount of data when Y:U:V=4:1:1 is ¾ of the amount of data when Y:U:V=4:2:2. In a bandwidth of image display in a TV monitor and an LCD panel, Y:U:V=4:1:1 is an enough amount of information. Therefore, the VRAM, which is optimally used in terms of memory capacity and data transfer efficiency, should be compatible with the storage method of Y:U:V=4:1:1. For this reason, the storage method of Y:U:V=4:1:1 is adopted for the VRAM in this embodiment.

For example, if the image capturing device 10 corresponds to two million pixels, the amount of output data for each frame from the captured-image-signal processor 14 is equivalent to horizontal 1600 pixels and vertical 1200 pixels. The resizing circuit 20 resizes the output data from the captured-image-signal processor 14 into a VRAM size which is suitable for display, and stores the resized data in the VRAM of the memory 24.

As will be described later, in display processing at a clock of 13.5 MHz, a TV display area according to the NTSC consists of horizontal 720 pixels and vertical 480 lines. In order to configure VRAM data in this screen size, the resizing ratio of the resizing circuit 20 is set at 720/1600=9/20 in the horizontal and at 480/1200=2/5 in the vertical, so as to generate VRAM data.

On the other hand, in another display size, e.g., in a TV display of a PAL method (horizontal 720 pixels and vertical 575 lines), the setting of the resizing ratio in the resizing circuit 20 is changed accordingly, that is, the resizing ratio is set at 720/1600 in the horizontal and at 575/1200 in the vertical, so as to output VRAM data.

In some image capturing devices, when an electronic viewfinder (EVF) is displayed, the frame rate is increased by decreasing the number of lines to be read in the vertical direction to 600 lines by adding 2 lines in the vertical direction or by skipping subsequent two lines by every two lines forming a pair. In this way, when the EVF is used, the frame rate of reading in the image capturing device is increased by performing 2-pixel addition or 2-pixel skipping in the vertical direction so as to display the EVF in the TV monitor and LCD panel. In this case, the data read from the image capturing device is horizontal 1600 pixels and vertical 600 lines. This data is resized into a VRAM configuration of a TV field image of horizontal 720 pixels and vertical 240 lines, so as to display the EVF in the TV monitor and LCD panel. The resizing ratio of this case is 720/1600=9/20 in the horizontal and 240/600=2/5 in the vertical, which is the same as the above-mentioned resizing ratio.

Referring back to FIG. 1, reference numeral 26 is a first-in first-out (FIFO) buffer for converting the video data output from the memory interface 22 to data having a different data rate. Although the details will be described later, the FIFO 26 converts a data sequence of 18 MHz from the memory interface 22 to a data sequence of 13.5 MHz, which is suitable for display in a TV monitor of an NTSC method or a PAL method.

(Explanation of the FIFO 26)

Figure 2:
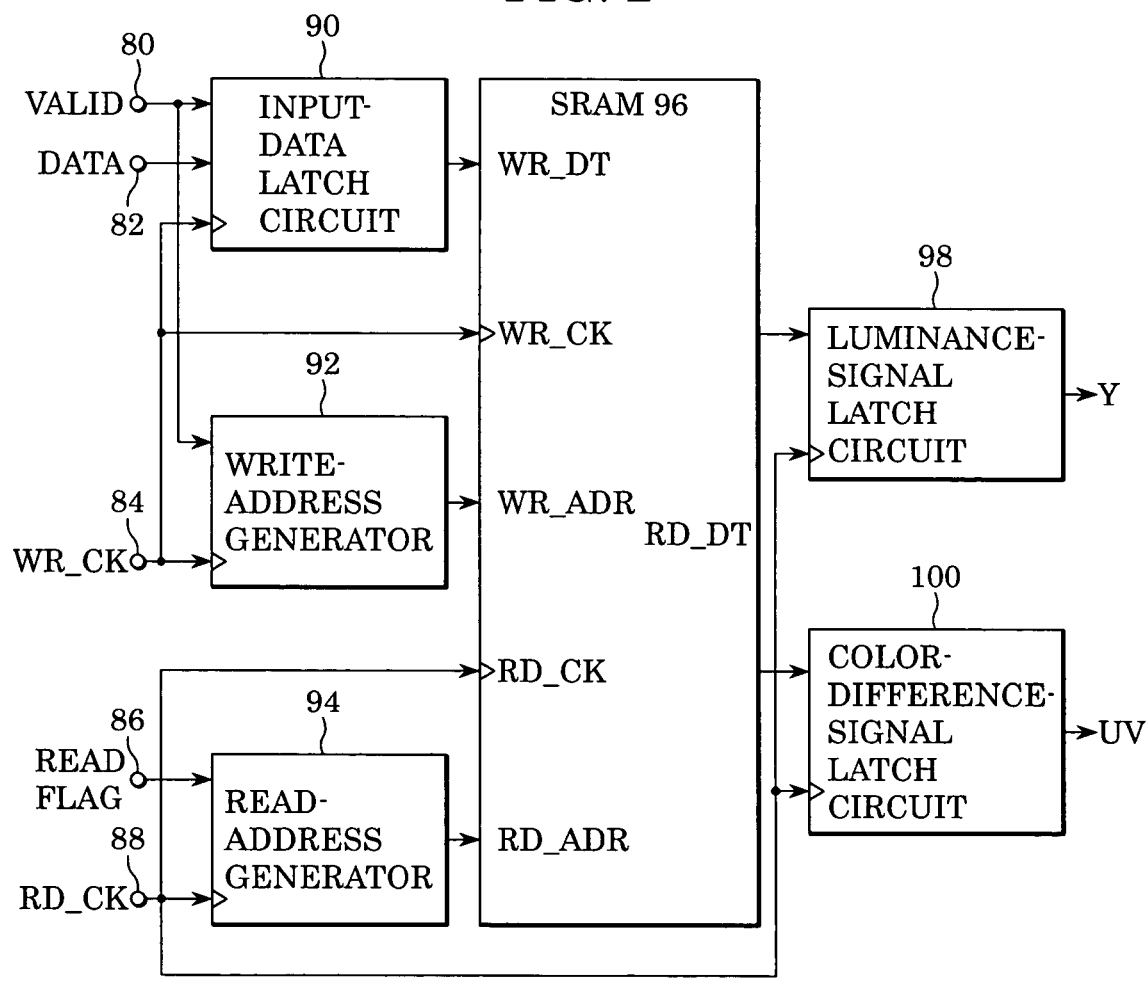
FIG. 2 shows the internal configuration of a FIFO 26.

Now, the internal configuration of the FIFO 26 is described with reference to FIG. 2. A VALID flag, which indicates that write data is valid, is input from the memory interface 22 to an input terminal 80, and the write data DATA is input from the memory interface 22 to an input terminal 82. Further, a write clock WR_CK is input to an input terminal 84, a read flag, which defines timing for reading data from the FIFO 26, is input to an input terminal 86, and a read clock RD_CK is input to an input terminal 88.

When the VALID flag is 1, video data is input to the input terminal 82, and when the VALID flag is 0, no video data is input to the input terminal 82. In this embodiment, the write clock WR_CK is a clock of 18 MHz, which is obtained by dividing 36 MHz output from the TG 16. The rate of the write clock WR_CK does not always match the rate of the VALID flag. The rate of writing data into the FIFO 26 substantially matches the rate of reading video data from the image capturing device 10, but the rate of the write clock WR_CK is irrelevant to the rate of writing data into the FIFO 26.

An input-data latch circuit 90 captures the data from the input terminal 82 when the VALID flag is 1. A write-address generator 92 generates a write address which is incremented according to the write clock WR_CK when the VALID flag is 1. A read-address generator 94 generates a read address which is incremented according to the read clock RD_CK when the read flag is 1.

Reference numeral 96 denotes an SRAM including a data writing port and a data reading port. The output data from the input-data latch circuit 90 is input to the data writing port WR_DT, the write clock WR_CK from the input terminal 84 is input to a write clock port WR_CK, the output from the write-address generator 92 is input to a write-address port WR_ADR, the read clock RD_CK from the input terminal 88 is input to a read clock port RD_CK, and the output from the read-address generator 94 is input to a read-address port RD_ADR. The SRAM 96 writes the data from the input-data latch circuit 90 in the location indicated by the write address generated by the write-address generator 92 according to the write clock WR_CK.

Also, when the read flag at the input terminal 86 is 1, the SRAM 96 reads data from the location indicated by the read address generated by the read-address generator 94 according to the read clock RD_CK, and outputs the read data from a read-data output port RD_DT. However, when the read flag at the input terminal 86 is 0, the SRAM 96 does not read data. The read flag changes at a rate equal to the read clock of 13.5 MHz of the FIFO 26. The read clock RD_CK is n times of 11.04 MHz, wherein n is 2 or 4. Therefore, the write clock WR_CK and the read clock RD_CK are completely asynchronous.

A luminance-signal latch circuit 98 captures luminance data in the output data from the SRAM 96 according to the read clock RD_CK, and the color-difference-signal latch circuit 100 captures color-difference data in the output data from the SRAM 96 according to the read clock RD_CK. The luminance-signal latch circuit 98 and the color-difference-signal latch circuit 100 are configured so that the output therefrom satisfies Y:U:V=4:2:2. When the VRAM on the memory 24 is configured for a data format of Y:U:V=4:2:2, the upper byte of the output from the SRAM 96 corresponds to luminance (Y) data and the lower byte corresponds to color-difference (UV) data. Thus, the output data can be easily separated into luminance (Y) data and color-difference (UV) data by dividing the bits, so that a data format of Y:U:V=4:2:2 can be realized. When the VRAM on the memory 24 is configured for a data format of Y:U:V=4:1:1, the luminance-signal latch circuit 98 and the color-difference-signal latch circuit 100 are configured so that the output from the SRAM 96 is distinguished from each other based on the address and that the data format of Y:U:V=4:1:1 is converted to Y:U:V=4:2:2. That is, the luminance-signal latch circuit 98 captures luminance data in the upper and lower bytes of the output data from the SRAM 96 according to the read address, and the color-difference-signal latch circuit 100 captures color-difference data which exists only in the lower byte of the output data from the SRAM 96 according to the read address. With this process, the output from the FIFO 26 can always be in a format of Y:U:V=4:2:2 regardless of the configuration of the VRAM. With this configuration of the FIFO 26, the writing data rate of 18 MHz, which is obtained by dividing the output clock of the TG 16, of the image data captured by the image capturing device 10 is converted to a rate of 13.5 MHz of the read clock of the FIFO 26.

As shown in FIG. 1, the FIFO 26 includes a FIFO 26a for a natural image and a FIFO 26b for OSD. In the two FIFOs, the capacity of the SRAM 96 is different from each other due to the difference in the data size of each pixel. However, the amount of FIFO pixels for each screen is almost the same. Also, the function and operation are almost the same in the two FIFOs.

Referring back to FIG. 1, delay circuits 28 and 30 serve for adjusting timing. Each delay circuit includes a flip-flop (FF) and delays data in the unit of a clock of 13.5 MHz. In this case, the delay circuits 28 and 30 delay the luminance signal Y and the color-difference signals U/V from the FIFO 26 according to a circuit delay in a highlight display circuit 32 and a palette converter 34, which will be described later.

The highlight display circuit 32 serves for highlighting high-intensity and low-intensity parts of natural image data from the image capturing device 10 by using a function of on screen display (hereinafter referred to as OSD). The internal configuration of the highlight display circuit 32 is described below with reference to FIG. 4.

(Explanation of the Highlight Display Circuit 32)

Figure 4:
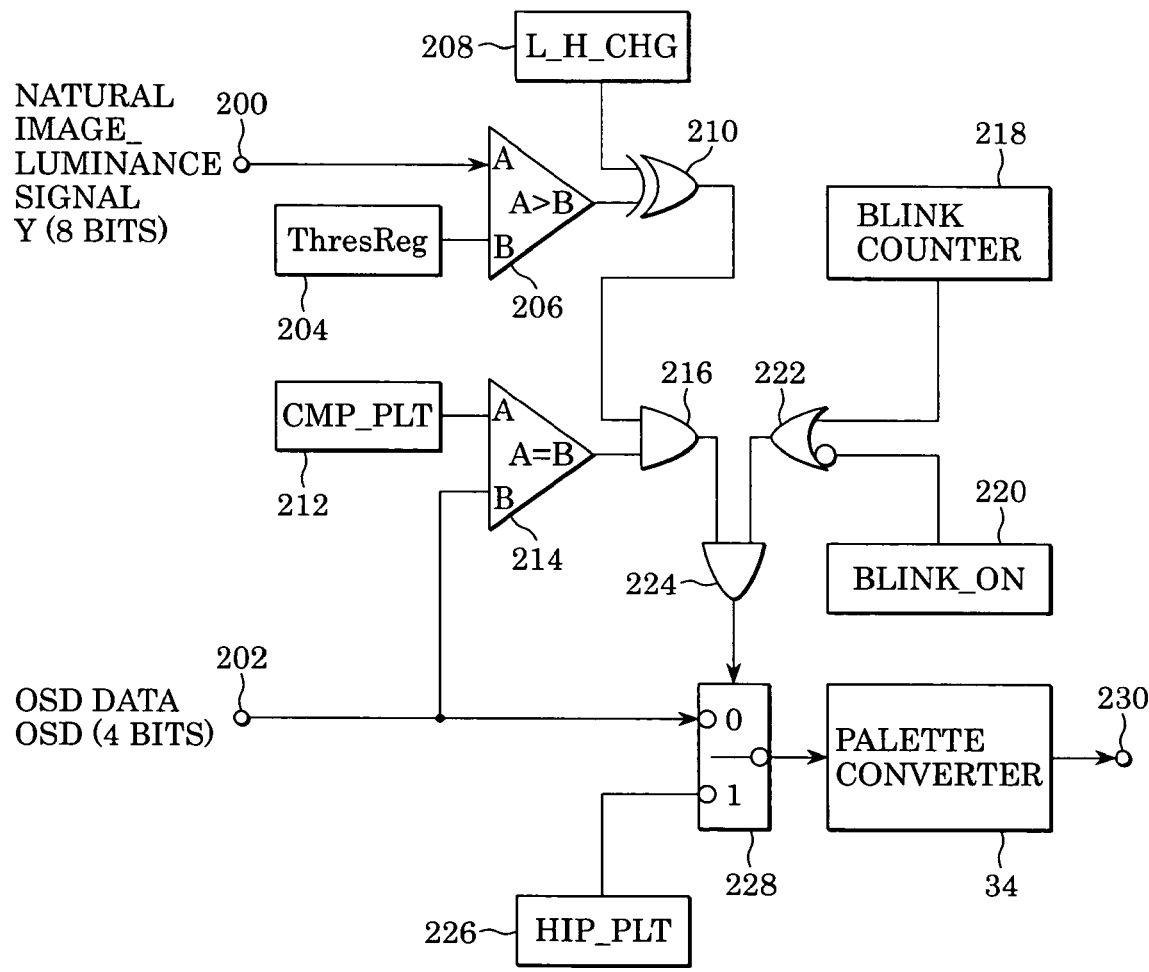
FIG. 4 shows the internal configuration of a highlight display circuit 32.

FIG. 4 shows the internal configuration of the highlight display circuit 32 shown in FIG. 1. Hereinafter, the highlight display circuit 32, which highlights high-intensity and low-intensity parts of natural image data from the image capturing device 10 by using the function of OSD, will be described with reference to FIG. 4.

In FIG. 4, reference numeral 200 denotes input of the luminance signal of the natural image from the FIFO 26 shown in FIG. 1. The luminance signal has a data width of 8 bits. Reference numeral 202 denotes input of the OSD signal from the FIFO 26, and the OSD signal has a data width of 4 bits. Reference numeral 204 denotes a register including an 8-bit FF, in which a threshold of a high-intensity level is set. Reference numeral 206 denotes a comparator which compares the level of the input 200 and the value of the register 204. The comparator 206 outputs a 1-bit flag signal of 1 when the level of the input 200 is larger, and outputs a 1-bit flag signal of 0 when the level of the input 200 is smaller. Reference numeral 208 denotes a register including a 1-bit FF. The flag signal output from the comparator 206 is allowed to pass through an exclusive-OR circuit 210. When the register 208 is 0, the flag signal from the comparator 206 is noninverted and the high-intensity part of the natural image is highlighted. When the register 208 is 1, the flag signal from the comparator 206 is inverted and the low-intensity part of the natural image is highlighted.

Reference numeral 212 denotes a register including a 4-bit FF, in which a basic OCD value for performing highlight display is set. Reference numeral 214 denotes a comparator for matching which compares the OSD data from the input 202 and the value of the register 212 and outputs 1 when the both values match. Reference numeral 216 denotes an AND circuit for performing an AND operation of the output from the exclusive-OR circuit 210, which outputs a result flag of a high-intensity level detecting circuit system, and the output from the comparator 214, which outputs a result flag of a circuit system for determining the basic OSD value. The corresponding pixel when the output of the AND circuit 216 is 1 is a pixel to be highlighted.

Reference numeral 218 denotes a blink counter which counts every two cycles (2V) of a TV vertical synchronization signal.

When the NTSC method is used,

Time of 1V=1/fv; fv=(2/525)×(4500000/286)=59.94 Hz, and 1V≈16.683 msec; and 2V=33.366 msec. Therefore, the counter counts every 33.36 msec.

When the PAL method is used,

Time of 1V=1/fv; fv=50 Hz, and 1V=20 msec; and 2V=40 msec. Therefore, the counter counts every 40 msec.

The blink counter 218 includes a register for setting a blink cycle. The value set in the register is used as a counter cycle of the blink counter, and switching between 1 and 0 is performed at every cycle of the counter so as to output a flag signal. The flag signal output from the blink counter 218 is input to one of input terminals of an OR circuit 222. Also, the output from a BLINK_ON register 220 including a 1-bit FF is input to the other inversion input terminal of the OR circuit 222. When the BLINK_ON register 220 is 0, the output from the OR circuit 222 is always 1 regardless of the flag signal output from the blink counter 218, and thus blink is not performed. On the contrary, when the BLINK_ON register 220 is 1, the status of the flag signal output from the blink counter 218 is output to the OR circuit 222, so that blink is performed.

Reference numeral 224 denotes an AND circuit which outputs the AND of the signals from the AND circuit 216 and the OR circuit 222. A selector 228 is switched based on the output from the AND circuit 224. The selector 228 switches between the input of OSD data 202 and the data of a HIP_PLT register 226. The selector 228 outputs the OSD data from the input 202 when being set to 0 and outputs the data from the HIP_PLT register 226 when being set to 1. The data from the HIP_PLT register 226 is data of OSD in which a palette color for high intensity or low intensity is set. A palette converter 34 shown in FIG. 4 corresponds to a palette converter 34 shown in FIG. 1, which serves as a circuit for converting the OSD data to palette data, as described above. Palette data generated in the palette converter 34 is output from a terminal 230.

That is, highlight display herein means a function of detecting whether the luminance level of a target pixel is higher or lower than a predetermined level, replacing the pixel with OSD of high-intensity based on the detection result, and displaying blink or the like based on whether or not the pixel is replaced with OSD.

Referring back to FIG. 1, the palette converter 34 is a circuit for converting OSD data of characters and icons to palette data having a ratio of Y:U:V=4:2:2, in which Y is 8 bits and UV is 8 bits.

However, when the OSD data is expressed with 65536 colors, in which each of Y and UV is 8 bits, as in natural-image data captured by the image capturing device, the amount of data of each pixel is too large, and thus a large memory capacity for the OSD data is required accordingly. In addition, the amount DRAM data to be read for display (bandwidth of DRAM) is significantly lost. For these reasons, the colors for expressing the OSD data must be reduced and effective OSD must be performed on the TV monitor and LCD panel. The amount of OSD data is less than that of natural-image data. Hereinafter, a case where 16 colors (4 bits) can be simultaneously generated and 65536 colors (16 bits) can be expressed will be described.

When 16 colors are simultaneously generated, that means each pixel of the OSD data stored in the memory 24 consists of 4 bits. When the size of VRAM (e.g., TV display in the NTSC method) is horizontal 720 pixels×vertical 480 lines, the amount of data is 720×480×4 bits=172800 bits, which is about a quarter of the amount of natural-image data from the image capturing device 10.

Specifically, in order to realize expression with 65536 colors (16 bits), 16 palette registers each having a 16-bit width are provided in the circuit so that one of the 16 palette registers can be selected based on the value indicated by the OSD data. That is, the number of colors which are simultaneously generated in one screen depends on the bit width of the OSD data, and the number of colors in the palette depends on the bit width of a palette register. In this configuration, the number of colors which are simultaneously generated is limited while maintaining the number of colors in the palette, so that the amount of data in the OSD area is reduced.

Herein, colors in the palette consist of

Bit 15|Bit 14|Bit 13|Bit 12|Bit 11|Bit 10|Bit 9|Bit 8|T_SW|Y (6)|Y(5)|Y(4)|Y(3)|Y(2)|Y (1)|Y(0)|

Bit 7|Bit 6|Bit 5|Bit 4|Bit 3|Bit 2|Bit 1|Bit 0|U(7)|U(6)|U(5) |U(4)|V(7)|V(6)|V(5)|V(4)|.

The bit of T_SW serves as a switch flag between translucent display and non-transparent display. The gradation of the luminance signal Y of OSD consists of 7 bits, and each of the color-difference signals U and V consists of 4 bits. With these colors, considerably practical OSD can be performed.

In FIG. 1, reference numeral 36 denotes a superimposing circuit for superimposing the OSD data including characters on the natural-image data from the image capturing device 10. In this circuit configuration, a transparent color is assigned to one of the colors in the palette (e.g., FF00h) and the original natural image is output as is for the transparent part. Accordingly, an OSD image and a natural image can be displayed in units of pixels. Furthermore, by providing a selector, which selects whether or not to perform superimposing, at the output stage of the superimposing circuit 36 and by switching the selector so as to output only a natural image, only the natural image can be displayed without superimposing OSD data thereon. The internal configuration of the superimposing circuit 36 is described below with reference to FIG. 3.

(Explanation of the Superimposing Circuit 36)

Figure 3:
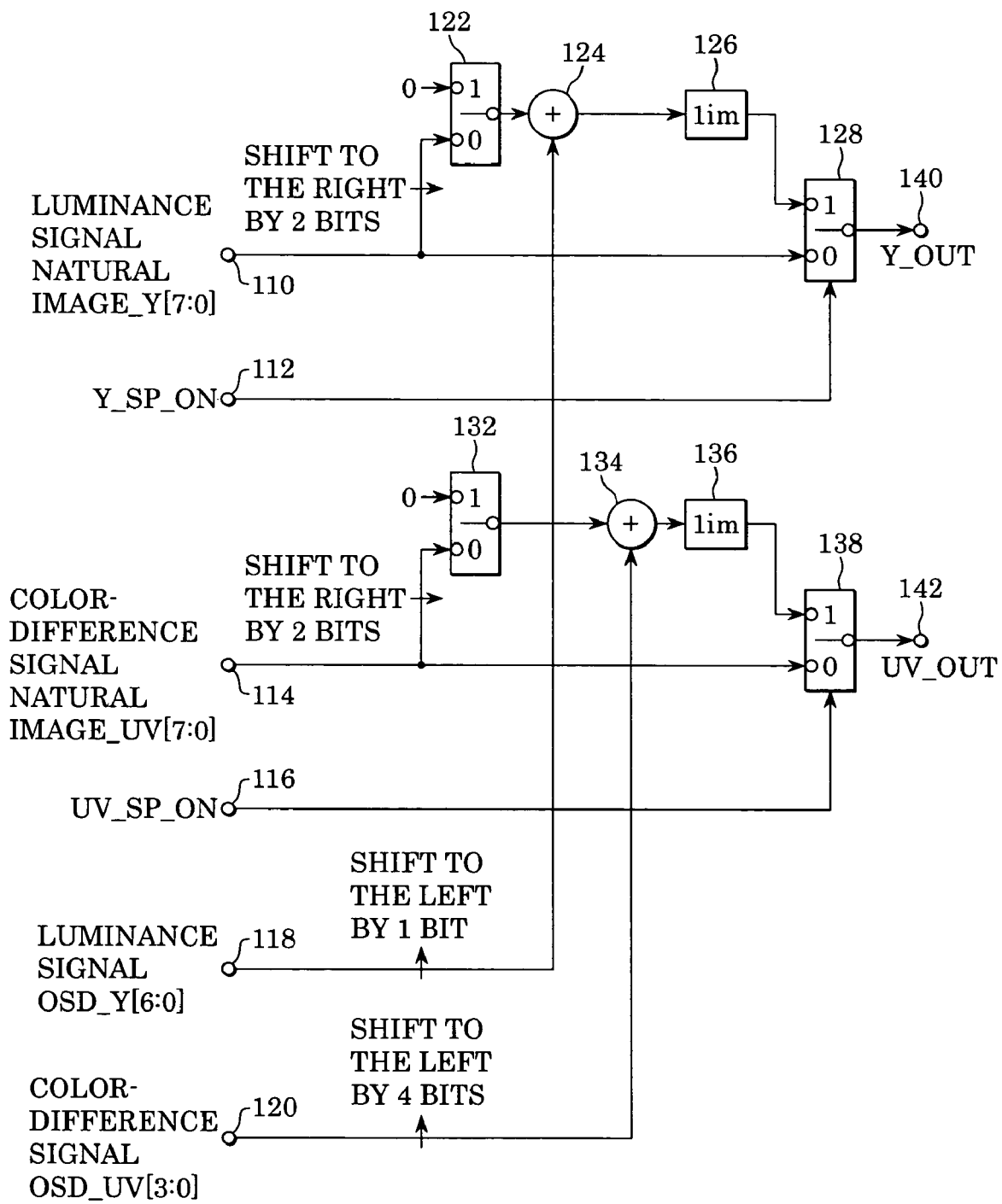
FIG. 3 shows the internal configuration of a superimposing circuit 36.

FIG. 3 shows the internal configuration of the superimposing circuit 36. In FIG. 3, reference numeral 110 denotes an input of luminance data (8 bits) of a natural image, and reference numeral 112 denotes an ON/OFF control signal of superimposing (Y_SP_ON). The ON/OFF control signal is Y_SP_ON=0 in a case of a transparent color in the above-described palette converter, and is Y_SP_ON=1 in a case of other than a transparent color so as to perform superimposing. In order to forcefully turning OFF superimposing, Y_SP_ON is set to 0.

In FIG. 3, reference numeral 114 denotes an input of color-difference data (8 bits) of a natural image, and reference numeral 116 denotes an ON/OFF control signal of superimposing (UV_SP_ON). As in the luminance signal, the ON/OFF control signal is UV_SP_ON=0 in a case of a transparent color in the above-described palette converter, and is UV_SP_ON=1 in a case of other than a transparent color so as to perform superimposing. In order to forcefully turning OFF superimposing, UV_SP_ON is set to 0.

In FIG. 3, reference numeral 118 denotes an input of luminance data (7 bits) of OSD. By shifting the luminance data to the left by 1 bit immediately after the input, the level thereof is matched to the data of the upper 7 bits of the luminance data (8 bits) of the natural image. Reference numeral 120 denotes color-difference data (4 bits) of OSD. By shifting the color-difference data to the left by 4 bits immediately after the input, the level thereof is matched to the data of the upper 4 bits of the color-difference data (8 bits) of the natural image.

Further, reference numeral 122 denotes a switch which is switched based on the bit of the above-mentioned T_SW. When T_SW=0, translucent display is performed, and when T_SW=1, non-transparent display is performed. In the translucent display, the luminance data of the natural image is shifted to the right by 2 bits so as to reduce the level thereof to ¼ and the luminance data is input to an adder 124, which adds the luminance data of the natural image and the luminance data of OSD. In the non-transparent display, the luminance data of the natural image is not input to the adder 124, but only the luminance data of OSD is output through the adder 124. Reference numeral 126 denotes a limiter for limiting the data width of 9 bits obtained in the adder 124 to a data width of 8 bits. Reference numeral 128 denotes a switch which is switched based on the above-mentioned Y_SP_ON signal. The luminance signal from the switch 128 is output from an output terminal 140.

Reference numeral 132 also denotes a switch which is switched based on the bit of the above-mentioned T_SW, as the switch 122. When T_SW=0, translucent display is performed, and when T_SW=1, non-transparent display is performed. In the translucent display, the color-difference data of the natural image is shifted to the right by 2 bits so as to reduce the level thereof to ¼ and the color-difference data is input to an adder 134, which adds the color-difference data of the natural image and the color-difference data of OSD. In the non-transparent display, the color-difference data of the natural image is not input to the adder 134, but only the color-difference data of OSD is output through the adder 134. Reference numeral 136 denotes a limiter for limiting the data width of 9 bits obtained in the adder 134 to a data width of 8 bits. Reference numeral 138 denotes a switch which is switched based on the above-mentioned UV_SP_ON signal. The color-difference signal from the switch 138 is output from an output terminal 142.

Referring back to FIG. 1, a synchronizer 38 synchronizes color-difference sequential signals, and an encoder 42 performs chroma encoding compatible with the NTSC method or the PAL method.

A delay circuit 40 delays the luminance signal Y in accordance with a processing delay of the synchronizer 38 and the encoder 42.

A D/A converter 44 converts the digital luminance signal Y to an analog signal, and a D/A converter 46 converts the encoded digital chroma signal to an analog signal.

Reference numeral 70 denotes an output terminal for the analog luminance signal, and reference numeral 72 denotes an output terminal for the analog chroma signal, each corresponding to the output of ASIC (application-specific integrated circuit).

A low-pass filter (LPF) 50 removes high-frequency noise of the analog luminance signal after D/A conversion, and a band-pass filter (BPF) 52 removes high- and low-frequency noise of the analog chroma signal after D/A conversion.

A mixer 54 mixes the analog luminance signal from the LPF 50 and the analog chroma signal from the BPF 52 and generates a video composite signal to be displayed on a TV monitor 58. A video amplifier 56 amplifies the video composite signal so as to have the amplitude and output impedance according to a TV standard and outputs the signal. The TV monitor 58 displays a visible image generated based on the composite video signal from the video amplifier 56.

A quartz oscillator 60 generates a sub-carrier, which is used for decoding the encoded chroma signal into color-difference signals. An LCD controller 62 converts the luminance signal Y and the chroma signal C to a signal to be displayed in an LCD panel 64 and generates timing of display. The LCD panel 64 displays a visible image based on the luminance signal Y and the chroma signal C.

The LCD controller 62 converts the luminance signal Y from the LPF 50 and the modulation chroma signal C from the BPF 52 to an RGB signal according to the sub-carrier frequency from the quartz oscillator 60 and applies the RGB signal together with a driving pulse to the LCD panel 64. The LCD panel 64 displays the image captured by the image capturing device 10 on the screen thereof.

(Operation 1)

Hereinafter, a case where highlight display is performed in an EVF before taking a picture will be described.

The image capturing device 10 shown in FIG. 1 operates so as to sequentially read each field of captured data in horizontal 1600+α pixels×vertical 600+β lines. The A/D converter 12 converts the sequential analog data from the image capturing device 10 to digital data and input the data to the captured-image-signal processor 14. The "α" is extra pixels (32 to 64 pixels) required by a filter in the horizontal direction, and the "+β" is extra lines (3 to 6 lines) required by a filter in the vertical direction.

The captured-image-signal processor 14 generates a luminance signal Y and color-difference signals U and V in the above-described processing, creates video data in Y:U:V=4:2:2 format of horizontal 1600 pixels×vertical 600 lines, and inputs the video data to the resizing circuit 20. The resizing circuit 20 resizes the video data in Y:U:V=4:2:2 format of horizontal 1600 pixels×vertical 600 lines, which has been supplied from the captured-image-signal processor 14, with a resizing ratio of 9/20 in the horizontal pixels and 2/5 in the vertical lines, and then outputs the data in Y:U:V=4:1:1 format of horizontal 720 pixels×vertical 240 lines to the memory I/F 22. The memory I/F 22 prepares two VRAM data areas, each for video data of horizontal 720 pixels×vertical 240 lines, on the memory 24. Then, the memory I/F 22 writes the first field of the resized data from the resizing circuit 20 in one of the VRAM data areas and writes the second field of the resized data in the other VRAM data area. In this way, the two VRAM data areas are alternately rewritten by each field. When the memory I/F 22 is writing VRAM data, it reads the VRAM data which is not being written at the same time and outputs the VRAM data to the FIFO 26. At this time, if the VRAM data which is being written is read and displayed, temporally shifted data is displayed at the border of the written data, and thus an unsightly image will be displayed. For this reason, the two VRAM data areas are provided on the memory 24 in order to separate the write VRAM (active VRAM) and the read VRAM (view VRAM). Further, several frames of data for OSD are stored in the memory 24. In an area for OSD, data (simultaneously-generated color of 16 colors in 4 bits in each pixel) for displaying current time (month-day-year and hour-minute-second) and picture-taking information is stored.

The VRAM data in Y:U:V=4:1:1 format and the OSD data read by the memory I/F 22 are written in the FIFO 26. Then, according to the above-described operation of the FIFO 26, a luminance signal Y, color-difference signals U and V, and OSD data are separately output at a data rate of 13.5 MHz. The luminance signal Y is input to the delay circuit 28, the color-difference signals U and V are input to the delay circuit 30, and the OSD data is input to the highlight display circuit 32.

In the highlight display circuit 32, basic OSD data is set to CMP_PLT of the register 212 shown in FIG. 4, and the data value of the palette set to a high-intensity color is set to HIP_PLT of the register 226. For example, when HIP_PLT of the register 226 is set to 3, a colorless high-intensity palette color is generated by setting the luminance to 70H and each of U and V to 00H for the palette color of OSD data 3, so that a palette color particularly suitable for highlight display is set. Then, according to the output flag of the AND circuit 224, OSD data 0 set to a transparent palette color and OSD data 3 set to a high-intensity color are switched by the selector 228. Then, the output therefrom is converted to a palette color for highlight in the palette converter 34.

Referring to FIG. 1, the output from the palette converter 34, the luminance signal Y output from the delay circuit 28, and the color-difference signals U and V output from the delay circuit 30 are input to the superimposing circuit 36. Then, as described above, the signals from the superimposing circuit 36 are processed in the synchronizer 38, the encoder 42, and the D/A converters 44 and 46, so that an analog luminance signal and a modulation chroma signal are output, and then a visible image is displayed on the LCD panel 64.

Figure 5:
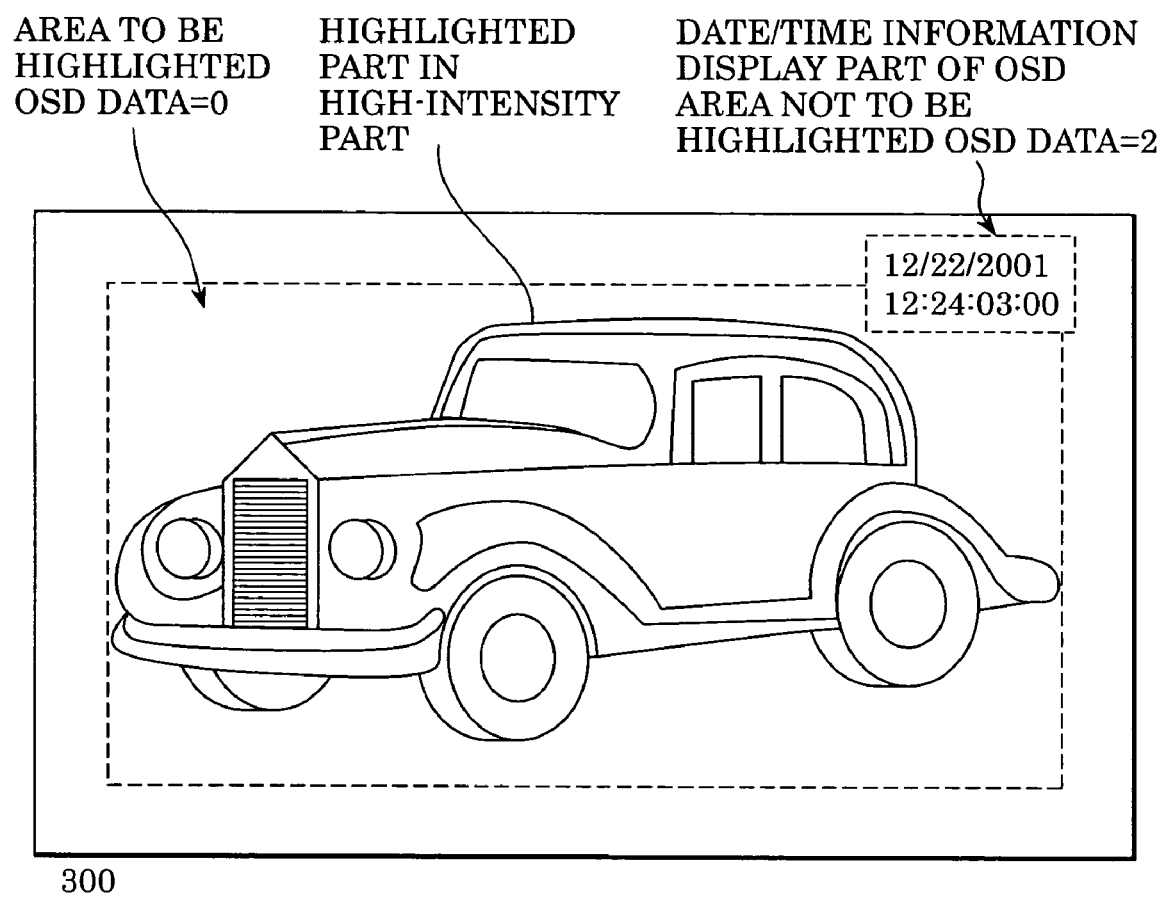
FIG. 5 is an image view of highlight display.

Now, a display state will be described with reference to an image view of highlight display shown in FIG. 5. The outermost solid-line frame defines an image display area of the LCD panel, and the inner broken-line frame defines an area of OSD data=0. By setting CMP_PLT of the register 212 to 0, highlight display is performed in high-intensity parts (parts indicated by arrows) of this area. An area defined by a dotted line at the upper right portion of FIG. 5 is set to OSD data=2. In this area, OSD data and natural-image data are displayed translucently. This area is used for displaying date and time and is not highlighted. In this way, by specifying basic OSD data, the area for highlight display can be limited, and information about picture taking and the like is not highlighted but is kept in a clear condition. Then, by setting the blink counter 218 to 1 to 2 seconds and setting the BLINK_ON register 220 to 1, blink of highlight display and original natural-image display is performed in the highlight areas, so that the operator can visually understand a message in a high-intensity part in the EVF.

(Operation 2)

Next, a case where highlight display is performed in an image enlarged by electronic zoom will be described.

Figure 6:
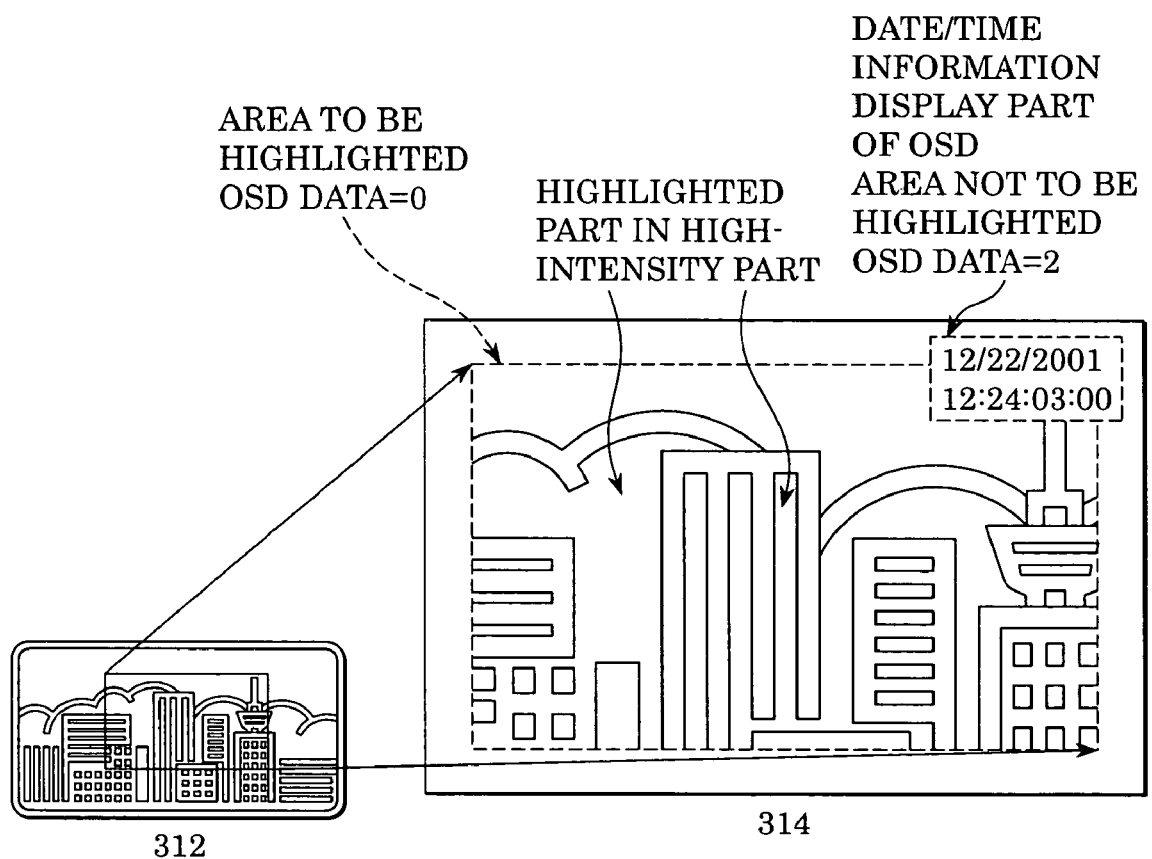
FIG. 6 is an image view of highlight display at electronic zoom.

FIG. 6 shows an image view of electronic zoom. Reference numeral 312 in FIG. 6 denotes an image displayed on the LCD panel when the electronic zoom is set to a wide angle. In this wide image 312, many outside buildings are shown, and high-intensity parts, such as a surface reflecting sunlight of the buildings and clouds, are highlighted. By zooming the wide image 312 by electronic zoom, an image 314 can be obtained.

The operation of electronic zoom is realized by changing the resizing ratio of the resizing circuit 20 shown in FIG. 1. For example, the data size of the wide image 312 after being processed by the captured-image-signal processor 14 is horizontal 1600 pixels×vertical 600 lines. By resizing this data to 9/20 in the horizontal and 2/5 in the vertical, the data in Y:U:V=4:1:1 format of horizontal 720 pixels×vertical 240 lines is output from the resizing circuit 20. Then, the resized data is displayed in the LCD, as described above. On the other hand, the image 314 is obtained by zooming the central part of the wide image 312 at 4× magnification. At this time, the output from the captured-image-signal processor 14 is horizontal 400 pixels×vertical 150 lines. The resizing ratio of the resizing circuit 20 is set to 9/5 in the horizontal and 8/5 in the vertical, so as to generate VRAM data of horizontal 720 pixels×vertical 240 lines.

Then, the data read from the memory 24 including VRAM is input to the FIFO 26, where the data rate is converted from 18 MHz to 13.5 MHz and the data is separated into a luminance signal Y and color-difference signals U and V, which are then output. The data of the luminance signal Y and the color-difference signals U and V output from the FIFO 26 is output as an enlarged image of the wide image 312. Further, the OSD data in the memory 24 is read by the reading circuit 22b of the memory I/F 22, the rate thereof is converted by the FIFO 26, and then the OSD data is output to the highlight display circuit 32. Herein, the same OSD data as that described in the Operation 1 is read from the FIFO 26 and is input to the highlight display circuit 32. Therefore, as described above with reference to FIG. 5, the area of OSD data=0 is highlighted. The area of OSD data=2 at the upper right of FIG. 6, which displays the date and time, is not highlighted and is clearly displayed.

When highlight display is performed in the known OSD circuit, OSD data for highlight display is created according to the luminance level of each pixel of natural-image VRAM data and the OSD data is written in the memory 24. Therefore, the OSD data must be created every time the natural-image VRAM data changes. On the other hand, in the highlight display circuit of the present invention, whether or not highlight display is performed is automatically determined based on the level of the luminance signal Y of a natural image read from the FIFO 26. Accordingly, when the size of image of an object changes by electronic zoom, pixels to be highlighted are switched by following the change in real time.

The OSD data output from the highlight display circuit 32 is input to the palette converter 34, and is converted to a luminance signal Yosd and color-difference signals UVosd for expressing palette colors. The output therefrom is input to the superimposing circuit 36, where the luminance signal Yosd and color-difference signals UVosd are mixed with the luminance signal Y and the color-difference signals UV of the natural image, so that a highlight display is superimposed. After that, as described above, the signals are processed by the synchronizer 38, the encoder 42, and the D/A converters 44 and 46 so that an analog luminance signal and modulation chroma signal are output, and then a visible image is displayed on the LCD panel 64.

Second Embodiment

Next, highlight display during playback is described with reference to FIG. 7.

Figure 7:
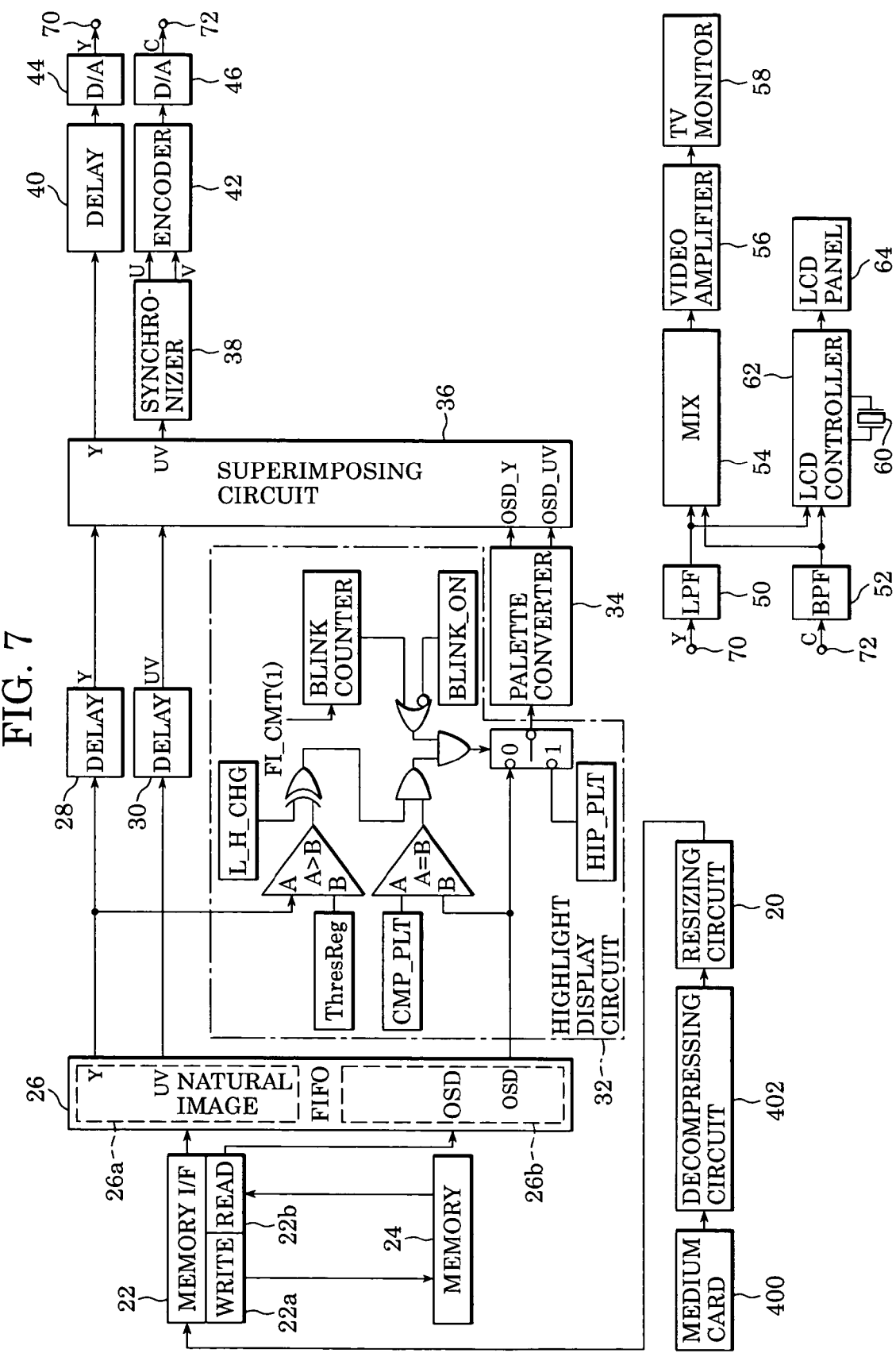
FIG. 7 is a block diagram showing a schematic configuration of a video signal processing apparatus according to a second embodiment of the present invention.

In FIG. 7, the circuit configuration except a medium card 400 and a decompressing circuit 402, that is, the configuration from the resizing circuit 20 to the output terminal 72 is the same as in the first embodiment shown in FIG. 1. Also, parts denoted by the same reference numerals as in FIG. 1 have completely the same function and characteristic as in FIG. 1. The medium card 400 is a removable recording medium, such as a CF card, and stores captured image data which is compressed according to a standard, such as JPEG (Joint Photographic Experts Group).

The decompressing circuit 402 is a circuit for decompressing compressed image data supplied from the medium card 400. The decompressing circuit 402 decompresses an image of horizontal 1600 pixels×vertical 1200 lines which has been compressed according to a JPEG standard and inputs the decompressed data to the resizing circuit 20 in the subsequent stage. The resizing circuit 20 is the same as that in the first embodiment, creates VRAM data (frame image) in Y:U:V=4:1:1 format of horizontal 720 pixels×vertical 480 lines at a resizing ratio of 9/20 in the horizontal and 2/5 in the vertical, and writes the resized data in the memory 24 through the memory I/F 22.

The operation thereafter is the same as that in the first embodiment. OSD data as well as the VRAM exists in the memory 24. The memory I/F 22 reads the natural-image data in Y:U:V=4:1:1 format in the VRAM and the OSD data from the memory 24 through the reading circuit 22b and outputs the data to the FIFO 26. The FIFO 26 separates the natural-image data of the VRAM into a luminance signal Y and color-difference signals U and V, and also outputs the OSD data while absorbing it to the FIFO buffer. The luminance signal Y and the color-difference signals U and V of the natural image from the FIFO 26 are delayed by the delay circuits 28 and 30, respectively, so as to be synchronized with the output of the OSD data from the palette converter 34. On the other hand, the OSD data in the FIFO 26 is replaced in the highlight display circuit 32 by recognizing that a pixel of a predetermined value or more of the luminance signal Y of the natural image is a pixel to be highlighted. A palette color for highlight display is assigned to the replaced OSD data, and the OSD data is converted to a luminance signal Yosd and color-difference signals UVosd in the palette converter 34. The luminance signal Y and the color-difference signals U and V of the natural image are superimposed on the luminance signal Yosd and the color-difference signals UVosd by the superimposing circuit 36, and the above-mentioned natural image Y of a high-intensity part is highlighted by the OSD of highlight display. Then, as described above, the signals are processed by the synchronizer 38, the encoder 42, and the D/A converters 44 and 46 so that an analog luminance signal and a modulation chroma signal are output, and a visible image is displayed on the LCD panel 64.

When the image shown in FIG. 5 is played back by the configuration shown in FIG. 7, high-intensity parts in the area of OSD data=0 at the upper part of FIG. 5 are highlighted, and the area of OSD=2 which displays the date and time at the upper right in FIG. 5 is not highlighted even if the intensity of the natural image is high. Accordingly, the high-intensity part of a played back image is displayed visually clearly, and supplementary information such as the date of picture taking is clearly displayed without being affected by highlight display.

Next, highlight display at zooming during playback is described with reference to FIGS. 6 and 7.

FIG. 6 was used for explaining electronic zoom in the EVF. Also, FIG. 6 can be applied to a case where compressed data of an image of outside buildings stored in the medium card 400 is played back by using the configuration shown in FIG. 7. The compressed data of an image of outside buildings is read from the medium card 400, the data is decompressed by the decompressing circuit 402, and an image of Y:U:V=4:2:2 of horizontal 1600 pixels×vertical 1200 lines is output to the resizing circuit 20. The resizing circuit 20 resizes the image at the resizing ratio of 9/5 in the horizontal and 8/5 in the vertical so as to realize 4× magnification used in the above case, and outputs image data in Y:U:V=4:1:1 format of horizontal 2880 pixels×1920 lines, so as to write the image data in the VRAM of the memory 24. The reading circuit 22b in the memory I/F 22 reads data corresponding to horizontal 720 pixels×vertical 480 lines at the center of the image data of horizontal 2880 pixels×1920 lines. The read data corresponds to the image 314 shown in FIG. 6. After that, as described above, the data or signals are processed by the FIFO 26, the delay circuits 28 and 30, the highlight display circuit 32, the palette converter 34, the superimposing circuit 36, the synchronizer 38, the encoder 42, and the D/A converters 44 and 46. Accordingly, an analog luminance signal and a modulation chroma signal are output, and a visible image is displayed on the LCD panel 64.

In this way, images can be zoomed during playback only by changing the resizing ratio of the resizing circuit 20. Also, highlight display can be performed in real time without rewriting OSD data.

As described above, highlight display can be performed in real time without rewriting OSD data according to the level of a luminance signal of image data captured by the image capturing device. Therefore, highlight display can be performed for an image displayed in an EVF.

Also, even when image data is scaled up/down by electronic zoom, pixel image data of OSD in DRAM need not be rewritten. Therefore, real-time highlight display can be performed according to the magnification of electronic zoom.

Also, by keeping highlight display ON/OFF for a predetermined period by using the incorporated counter, blinking of highlight can be performed without rewriting data.

Further, by using a circuit for switching the output of a result obtained by comparing the level of the luminance signal of the image data with a predetermined value set to the register to inversion/noninversion, the dark portion (low-intensity level) of the image data can be highlighted.

Still further, in a played back image, highlight display which immediately responds to the change of images can be performed. Furthermore, when a played back image is scaled up/down, highlight display which immediately responds to the change of zoom magnification can be performed.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A video signal processing apparatus comprising:
a first storage unit configured to store first image data;
a second storage unit configured to store second image data;
a comparing unit configured to compare luminance-signal component data in the first image data with a predetermined level;
a modifying unit configured to modify the second image data based on the output from the comparing unit; and
a synthesizing unit configured to synthesize the first image data and the second image data modified by the modifying unit and outputting the synthesized data,
wherein the modifying unit is configured to blink the second image data, in which the blink cycle is variable.

2. The video signal processing apparatus according to claim 1, wherein the modifying unit is configured to generate different patterns for at least two areas of a high-intensity area, a low-intensity area, and a normal-intensity area of the first image data, and superimpose the patterns on the first image data.

3. The video signal processing apparatus according to claim 1, wherein the first image data is a captured-image signal obtained by capturing a natural image and the second image data is OSD image data.

4. The video signal processing apparatus according to claim 3, wherein the comparing unit is configured to determine a high-intensity area or a low-intensity area based on the luminance level of the first image data and the modifying unit is configured to replace the high-intensity area or the low-intensity area with the second image data.

5. A video signal processing apparatus comprising:

a first storage unit configured to store input first image data; a second storage unit configured to store second image data; a comparing unit configured to compare luminance-signal component data in the first image data with a predetermined level;

a counting unit configured to count a blink cycle which is variable; a selecting unit configured to select the second image data or a third image data based on the output from the comparing unit and the output from the counting unit; and a synthesizing unit configured to synthesize the first image data and the output from the selecting unit, wherein the output from the selecting unit is configured to blink the second image data or the third image data.

* * * * *